Dec. 22, 1959  D. A. CUSANO ET AL  2,918,670
LUMINESCENT PRESENTATION APPARATUS
Filed Dec. 29, 1953
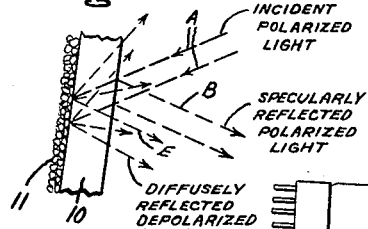
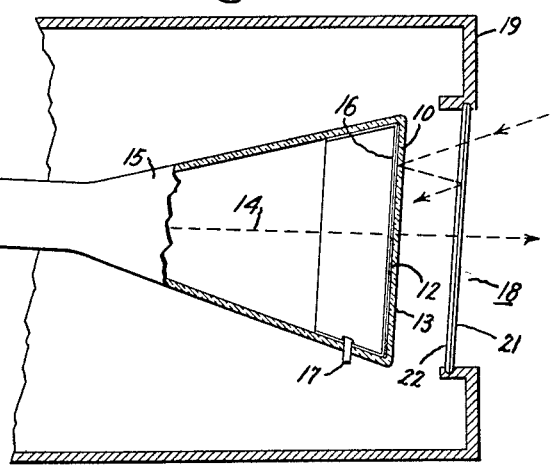
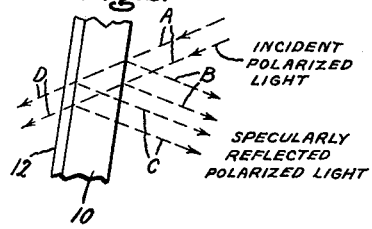
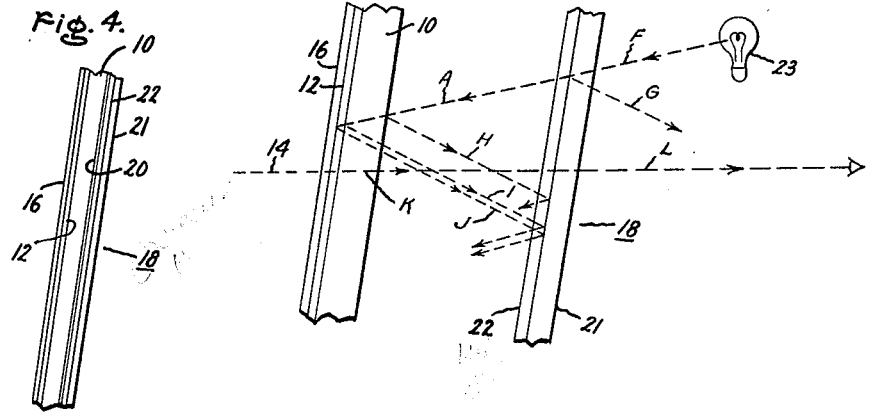
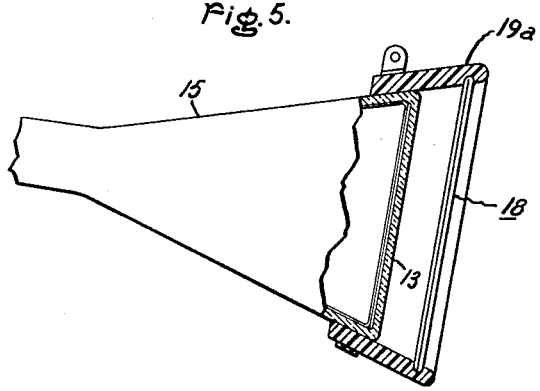
Inventors:
Dominic A. Cusano,
Frank J. Studer,
by Paul A. Frank
Their Attorney.

United States Patent Office 2,918,670
Patented Dec. 22, 1959

2,918,670

LUMINESCENT PRESENTATION APPARATUS

Dominic A. Cusano and Frank J. Studer, Schenectady, N.Y., assignors to General Electric Company, a corporation of New York Application December 29, 1953, Serial No. 400,850

5 Claims. (Cl. 340—369)

This invention relates to luminescent presentation apparatus and, more particularly, to apparatus for the pictorial presentation of an image upon a screen luminescent under the influence of electron bombardment.

Luminescent screens, such as those used in cathode ray tubes, generally consist of fine grains or particles of a luminescent phosphor coated on the surface of a transparent base comprising the viewing face of the tube. Such screens suffer from a diminution of sharpness and contrast as a result of optical phenomena which may be generally classified as "halation effects" and "reflection effects." By "halation effects" is meant the tendency of the phosphor particles of such screens diffusely to scatter and reflect light derived either from an external incident source or from the luminescence of the phosphor particles themselves in such a manner that they illuminate or excite adjacent phosphor particles of the screen. By "reflection effects" is meant the tendency of the particles to scatter and reflect light incident upon the screen from an external source back out of the screen, for example, in the general direction of an observer. Undesirable reflection effects also occur as a result of specular reflections from the front surface of the transparent base serving as the viewing face.

In order to reduce halation effects by even a small fraction, it has been proposed to make the transparent base of darkened glass or to mix black light-absorbing powders with the luminescent materials of the screen, both of which expedients involve a marked reduction in the brightness of the luminescent image.

Anti-reflection filters have proven quite effective in reducing specular reflections from the front surface of the viewing face of the luminescent screen but have proven ineffective in removing the diffusely scattered reflections from the surface of the phosphor coatings. This is because the external light incident upon the phosphor particles in such screens is depolarized in the diffuse reflection with the result that many of the reflected rays escape the filtering action of the anti-reflection filter regardless of its location.

Accordingly, an important object of the invention is to provide luminescent presentation apparatus characterized by negligible reflection effects derived from any reflecting surface of the apparatus.

Another object of the invention is to provide luminescent presentation apparatus characterized both by negligible halation effects and negligible reflection effects.

An additional object is to provide luminescent presentation apparatus having negligible reflection effects with little sacrifice in brightness of the image.

A further object is to provide luminescent presentation apparatus having negligible reflection effects yet made from simple, commercially available, relatively inexpensive components.

A still further object of the invention is to provide a new method of eliminating virtually all undesirable halation and reflection effects in a luminescent presentation system, and of doing so at the expense of only a relatively slight diminution in brightness.

In general, in accord with the invention, our improved luminescent presentation apparatus comprises a luminescent screen including a transparent continuous luminescent film, and an anti-reflection filter covering the viewing side of the screen. Suitable transparent continuous luminescent films and the methods of making them are described in our Patent 2,659,678, granted November 17, 1953, as well as in our prior patent application, Serial No. 200,908, now Patent No. 2,675,331 filed December 15, 1950, both of which are assigned to the present assingee. Because of their transparent, non-particulate nature, these transparent continuous luminescent films do not scatter light internally to the extent that convenional powdered phosphors do, with the result that virtually all halation effects are eliminated. In addition, such transparent continuous luminescent films reduce external light reflections and, to the extent that they are reflective, have substantially smooth-surfaced, undistorted, specular reflecting properties, as contrasted with the "rough surface" distorted light-scattering and diffusely reflecting properties of powdered phosphor screens. When subjected to polarized light, the specularly reflecting surface of the transparent luminescent films do not depolarize the reflected light, while the conventional powdered phosphor screens almost completely depolarize the reflected light. In accord with the present invention, an anti-reflection filter is used in combination with such transparent continuous luminescent films, and because of the relatively undistorted specular reflection emanating from the surface of such transparent films, the combination is virtually completely effective in eliminating all reflection effects.

In accord with a further feature of the invention, the transparent continuous luminescent film used in combination with the anti-reflection filter is deposited upon a highly polished glass base and, in addition, is itself thereafter highly polished to what may be termed "specular smoothness." Such highly polished surfaces ordinarily involve an undesirable increase in the intensity of specular reflection from these surfaces. However, since this specularly reflected light is not depolarized in reflection, it can be almost completely eliminated by the anti-reflection filter.

In accord with a still further feature of the invention, a highly reflective metal film is coated over the electron impinging surface of the transparent luminescent film utilized in combination with the anti-reflection filter. Because of the transparent nature of the glass base and luminescent film, the resulting screen becomes an excellent mirror; in other words, it reflects specularly almost all of the incident light. This metal film serves two important functions. First, it enables the removal of undesirable accumulated electrical charges on the luminescent film; and, secondly, it markedly increases the brightness of the luminescent image, since practically all phosphor-generated light is transmitted either directly or by reflection from the metal film out toward the observer. However, the use of such reflecting metal backing film on transparent screens has heretofore been restricted to fairly dark rooms because of the very high resultant increase in specular reflection of incident light from sources external to the screen. Here again, by virtue of the use of an anti-reflection filter in combination with the transparent screen, the increased specular reflection is eliminated, the advantage of charge accumulation removal is preserved, and the increased brightness of the image resulting from the presence of the metal film compensates to a large degree the reduction in brightness involved in the use of an anti-reflection filter.

The novel features believed characteristic of the invention are set forth in the appended claims; the invention itself, however, together with further objects and advantages thereof, may best be understood by referring to the following description taken in connection with the accompanying drawing, in which—

Fig. 1 is a schematic diagram of the reflection effects occurring with a phosphor-coated screen of the prior art;

Fig. 2 is a similar schematic diagram illustrating the specular reflection effects occurring on the surface of a continuous transparent luminescent film utilized in the present invention;

Fig. 3 is a side view partly in section of luminescent presentation apparatus embodying the invention;

Fig. 4 is an alternative arrangement of the luminescent presentation apparatus of the invention wherein the anti-reflection filter and the luminescent screen are unified to form a single, self-supporting luminescent screen characterized by negligible halation and reflecting effects;

Fig. 5 is another arrangement of our luminescent presentation apparatus wherein the anti-reflection filter is supported on the end of a cathode ray tube in spaced relation with the luminescent screen thereof; and Fig. 6 is an enlarged view of the luminescent screen and anti-reflection filter included in the apparatus of Fig. 3 together with a diagrammatic illustration of the operation of the invention.

Referring to Fig. 1, the reflection effects occurring with conventional powdered phosphor coated luminescent screens are illustrated. Incident light which has passed in one direction through an anti-reflection filter and thus has become circularly polarized passes through a transparent glass base 10 and impinges upon the rough surface of the phosphor particles 11. Because of the irregular rough surface of these particles, the incident light is diffusely scattered in all directions such that some of the light impinges upon the rough surface of adjacent particles and is re-reflected with the result that the reflected light E is both scattered and de-polarized. It is, of course, apparent that such diffusely scattered depolarized light which returns toward the general direction of the incident polarized light would not be rejected by an intercepting anti-reflection filter.

Referring now to Fig. 2, we have illustrated the reflection effects occurring in a luminescent screen utilizing a transparent continuous luminescent film such as is employed in the presentation apparatus of the present invention. Incident light which is passed in one direction through an anti-reflection filter and thus becomes circularly polarized first impinges upon the front smooth surface of the glass base 10 and a portion thereof is specularly reflected as shown by broken lines B. The incident polarized light then passes through transparent base 10 and impinges upon the front surface of the transparent luminescent film 12 and a portion of this light is likewise specularly reflected along broken lines C. Both the front surface reflections B and the transparent luminescent film reflections C remain polarized and thus may be rejected by an anti-reflection filter, as is well-known in the art. A considerable portion of the incident polarized light continues through transparent film 12 along broken lines D and is thus never reflected back toward an observer.

With regard to halation effects, it is obvious that an illumination or excitation of any small region of the phosphor particles of the screen shown in Fig. 1 produces a similar diffusely scattered illumination and excitation of adjacent phosphor particles, thereby producing the undesired halo surrounding the excited or illuminated small region. The illumination or excitation of a small region of the transparent luminescent film 12 of the screen of Fig. 2, on the other hand, merely produces a straight-line emanation of light in all directions with little diffusion, reflection, or rebounding of the light from adjacent regions since the film is continuous and transparent. It is thus apparent that the screen of Fig. 2 produces substantially no halation effects.

Efficient transparent, luminescent screens may be made by vapor depositing the luminescent film 12 upon a transparent base such as glass plate 10 during a chemical reaction of a phosphor base material such as zinc, cadmium and mixtures thereof and a sulfide or selenide compound in the presence of a suitable activating material vapor. As a specific example screen 12 may comprise a transparent zinc sulfide film activated with zinc and produced by vapor-depositing on glass base 10 the luminescent material produced by a chemical reaction between vapors of zinc chloride and hydrogen sulfide gas while the glass base 10 upon which this film 12 is deposited is maintained at a temperature between 500° and 600° C. Further descriptions of suitable transparent screens 13 and methods of making them are found in our above-mentioned Patent 2,659,678 and prior patent application Serial No. 200,908 now Patent No. 2,675,331. The techniques involved have now become generally well-known to those skilled in the art.

Referring now to Fig. 3, the luminescent presentation apparatus embodying one form of the invention is shown as comprising a luminescent screen 13 including a glass base 10 and a transparent luminescent film 12. Luminescent screen 13 is arranged with its transparent luminescent film-coated surface facing and adapted to receive electrons or an electron beam 14 projected from a suitable electron projecting means (not shown) of a cathode ray tube 15. Screen 13 comprises the viewing face of the cathode ray tube as shown.

Although not essential for the reduction of reflection effects, a smooth, highly reflective metal backing film 16 is coated on the phosphor film 12 of transparent luminescent screen 13. Metal film 16 may conveniently comprise vapor-deposited aluminum or silver. Film 16 preferably extends back along the internal walls of tube 15 and makes conductive contact with a metal terminal 17 sealed through the side wall of tube 15, which terminal 17 enables connection to ground or to a suitable source of high potential. As mentioned above, metal film 16 serves the purpose of enabling the removal of accumulated electrical charges on screen 13, and at the same time considerably increases the brightness of the luminescent image produced by screen 13 under the excitation of electron beam 14. This increase in brightness is produced without the usual accompanying increase in specular reflection because of the presence of an anti-reflection filter 18 located contiguous and substantially parallel to the viewing face of screen 13 so as to cover the screen. The words "contiguous" and "contiguously" are used herein to connote that the filter 18 may either be in actual contact with screen 13, as illustrated by Fig. 4, or may be slightly spaced therefrom as illustrated by Figures 3 and 5. When filter 18 is in actual contact with screen 17, as illustrated by Fig. 4, it is preferably bonded thereto by a suitable transparent cementitious plastic 20 having substantially the same index of refraction as filter 18. When filter 18 is spaced from the front face of screen 13 it is supported by a light shielding member 19 arranged to surround the front end of tube 15 thereby to shield screen 13 from all light rays except those which are incident thereon through filter 18. Light shielding member 19 may conveniently comprise the cabinet which supports tube 15, as illustrated by Fig. 3, or may be an annular collar which is supported directly on the front end of tube 15, as illustrated by Fig. 5.

Anti-reflection filter 18 preferably comprises a unidirectional circularly polarizing filter of the type sold by the Polaroid Corporation of Cambridge, Massachusetts under the name of a "Polaroid 1-way film HN 35 CP .030." Such anti-reflection filters include a linearly polarizing layer 21 and a quarter-wave retardation layer 22, which is oriented at 45 degrees to the transmission direction of the polarizer 22. In operation, incident, unpolarized light passing through such anti-reflection filters in linearly polarized, for example, vertically, by polarizing layer 21 and is then circularly polarized, for example, clockwise, by quarter-wave layer 22. Upon specular reflection from a surface of screen 13, the circular polarization persists, so that, upon returning back through quarter-wave layer 22, the light becomes linearly polarized horizontally, whereby it can no longer pass back through vertically polarizing layer 21 with the result that no specularly reflected light is transmitted through the anti-reflection filter 18. These anti-reflection properties of filter 18 apply only to light which is specularly reflected from a shiny and smooth surface and do not apply to light reflected from non-specular areas or to light that strikes screen 13 from the side, between the screen and the polarizer. This is why a light-impervious mounting 19 for filter 18 should be used.

The above-described Polaroid anti-reflection filters have a grayish appearance and a lower refractive index than glass, with the result that front surface reflections from these filters are less than are ordinarily present from the front surface of the glass plate 10 of screen 13. To the extent that reflections do occur from the front surface of anti-reflection filter 18, they can be further minimized by supporting the film at a slight angle, for example, from 2 to 5 degrees from the vertical, as illustrated, so that incident light is reflected toward the ground rather than toward the eye of an observer. The screen 13 of tube 15 is preferably tilted at a corresponding angle in order that it will remain substantially parallel to the plane of filter 18, but this is not essential, especially with the low tilting angles for filter 18 mentioned above.

The operation of luminescent presentation apparatus embodying the invention can best be understood by referring to Fig. 6. Incident, unpolarized light rays F from an external light source 23, impinge upon the front surface of anti-reflection filter 18 and a small portion thereof are reflected along a downward path G partly as a result of the forwardly tilted angle of the filter. The great majority of the light rays, however, are either absorbed by filter 18 or pass through filter 18 to emerge as circularly polarized light A. The incident, circularly polarized light rays A are specularly reflected partly from the front surface of glass plate 10 along path H, partly from the front surface of transparent luminescent film 12 along path I, and the remainder from the front mirror reflecting surface of metal film 16 along path J. Since all of these surfaces are smooth, specular surfaces, the angle of reflection in all cases equals the angle of incidence of such polarized light, no depolarizing occurs, and virtually all of such specularly reflected light is rejected by the linear polarizing plate 21 after it has passed through the quarter-wave plate 22 in accord with the operation of anti-reflection filter 18 as described above. Where a metal backing film 16 is not employed, the portion of the light specularly reflected therefrom along path J is, instead, merely transmitted into the interior of tube 15 along the path indicated by letter D in Fig. 2. Although the presence of metal film 16 thus increases the total amount of specular reflection, this has no deleterious effect since all such increased specular reflection is virtually totally rejected by anti-reflection filter 18.

Luminescent light generated by luminescent film 12 under the influence of electron beam 14 is, of course, unpolarized and is transmitted directly and by reflection from metal film 16 out toward the eye of an observer along path K. Although filter 18 absorbs some of this light, it does not totally reject the light and a considerable portion thereof emerges as linearly polarized light L.

Although the presence of anti-reflection filter 18 reduces to a considerable extent the amount of luminescent light L reaching an observer, this reduction in intensity is compensated to a large degree by the increase in the intensity of light generated by screen 13 as a result of the presence of the mirror surface metal film 16. The net result of the combination, therefore, is a substantially complete elimination of reflection effects from the luminescent presentation apparatus at the sacrifice of only a slight reduction in the brightness of the image. Moreover, because of the initial fairly high brightness of the transparent luminescent screen and the virtual elimination of halation and specular effects, the resulting transmitted luminescent picture is more than bright enough for television purposes and is much clearer and has more contrast than that observed with luminescent presentation apparatus employing conventional powdered phosphor type screens.

Although we have described above only a few specific embodiments of the invention, many modifications may be made; and we intend by the appended claims to cover all such modifications as fall within the true spirit and scope of the invention.

What we claim as new and desire to secure by Letters Patent of the United States is:

1. Luminescent presentation apparatus comprising a luminescent screen having a transparent base plate and a transparent non-particulate non-depolarizing luminescent film having smooth specularly reflecting surfaces on one surface of said plate, said luminescent film being polished to specular smoothness on the surface not contiguous to said transparent base plate, and an anti-reflection circularly polarizing filter contiguously covering the opposite face of said plate.

2. The luminescent presentation apparatus of claim 1 in which the contiguously covering anti-reflection circularly polarizing filter is in actual contact with and supported by said plate.

3. The luminescent presentation apparatus of claim 1 in which the contiguously covering anti-reflection circularly polarizing filter is slightly spaced and substantially parallel to said screen and is supported by a light-impervious member constructed and arranged to prevent light from reaching said screen other than through said filter.

4. The luminescent presentation apparatus of claim 1 wherein the anti-reflection filter comprises a unidirectional, circular polarizer consisting of a linearly polarizing plate and a quarter-wave retardation plate.

5. Luminescent presentation apparatus comprising a cathode ray tube having a viewing face comprising a glass plate, a transparent non-particulate non-depolarizing cathodoluminescent film having smooth specularly reflecting surfaces on the internal surface of said plate, said cathodoluminescent film being polished to specular smoothness on the surface not contiguous to said transparent base plate, a highly reflective metal film covering and secured to said transparent film, and an anti-reflection circularly polarizing filter contiguously covering the external surface of said viewing face.

References Cited in the file of this patent

UNITED STATES PATENTS

| | | |
|---|---|---|
| 2,380,241 | Jelly et al. | July 10, 1945 |
| 2,567,713 | Kaplan | Sept. 11, 1951 |
| 2,567,714 | Kaplan | Sept. 11, 1951 |
| 2,585,614 | Bailey et al. | Feb. 12, 1952 |
| 2,599,739 | Barnes | June 10, 1952 |
| 2,659,678 | Cusano et al. | Nov. 17, 1953 |